United States Patent
Kleymenov et al.

(10) Patent No.: US 11,930,027 B2
(45) Date of Patent: Mar. 12, 2024

(54) METHOD FOR EVALUATING QUALITY OF RULE-BASED DETECTIONS

(71) Applicant: Nozomi Networks Sagl, Mendrisio (CH)

(72) Inventors: Alexey Kleymenov, Massagno (CH); Alessandro Di Pinto, Malnate (IT); Moreno Carullo, Gavirate (IT); Andrea Carcano, San Francisco, CA (US)

(73) Assignee: Nozomi Networks Sagl, Mendrisio (CH)

( * ) Notice: Subject to any disclaimer, the term of this patent is extended or adjusted under 35 U.S.C. 154(b) by 295 days.

(21) Appl. No.: 17/563,106

(22) Filed: Dec. 28, 2021

(65) Prior Publication Data
US 2023/0224313 A1    Jul. 13, 2023

(51) Int. Cl.
*G06F 21/00* (2013.01)
*H04L 9/40* (2022.01)

(52) U.S. Cl.
CPC ...... *H04L 63/1425* (2013.01); *H04L 63/1416* (2013.01); *H04L 63/1466* (2013.01); *H04L 63/20* (2013.01)

(58) Field of Classification Search
None
See application file for complete search history.

(56) References Cited
U.S. PATENT DOCUMENTS

| | | | | |
|---|---|---|---|---|
| 7,377,431 | B2 * | 5/2008 | Urken ................ | G06Q 10/10 235/386 |
| 7,526,193 | B2 * | 4/2009 | Minato ............... | G06V 40/165 382/118 |

(Continued)

*Primary Examiner* — Maung T Lwin
(74) *Attorney, Agent, or Firm* — Jason Lee DeFrancesco

(57) ABSTRACT

The present invention relates to a method for evaluating quality of signature-based detections in an infrastructure provided with a plurality of sensors, comprising defining predefined rules for the rule-based detections, wherein the rules are of a silent type such that operate without generating alerts to the user of the infrastructure, collecting telemetry events at each of the sensors, storing the telemetry events of each of the sensors to respective local sensor databases operatively connected to the sensors, aggregate, at predetermined aggregating time intervals, the telemetry events from the local sensor databases to a central database, analyzing the telemetry events at the central database, by evaluating the telemetry events with respect to the rules and calculating the quality measurements of the rules, according to a plurality of predefined quality metrics in a predefined metrics time interval, wherein the quality metrics comprise precision metric, by counting the instances of false positives of the telemetry events with respect to the predefined rules, recall metric, by counting the instances of false negatives of the telemetry events with respect to the predefined rules and performance metric, by counting the instances of rules hits over predefined evaluation time interval and the ratio between the partial and full of the rules matching, wherein the method for evaluating quality of rule-based detections further comprises releasing verified rules for the rule-based detections as predefined rules having the quality measurements within a predetermined quality target range, and wherein the verified rules are of alerting type such that operate generating alerts to the user of the infrastructure.

14 Claims, 1 Drawing Sheet

(56) References Cited

U.S. PATENT DOCUMENTS

| | | | |
|---|---|---|---|
| 8,887,286 B2* | 11/2014 | Dupont | G06F 21/50 |
| | | | 726/25 |
| 9,306,965 B1* | 4/2016 | Grossman | H04L 63/1425 |
| 10,917,419 B2* | 2/2021 | Crotinger | G06F 17/18 |
| 10,984,338 B2* | 4/2021 | Morris, II | G06N 20/00 |
| 2018/0191766 A1* | 7/2018 | Holeman | H04L 63/20 |
| 2019/0073520 A1* | 3/2019 | Ayyar | G06V 40/173 |

* cited by examiner

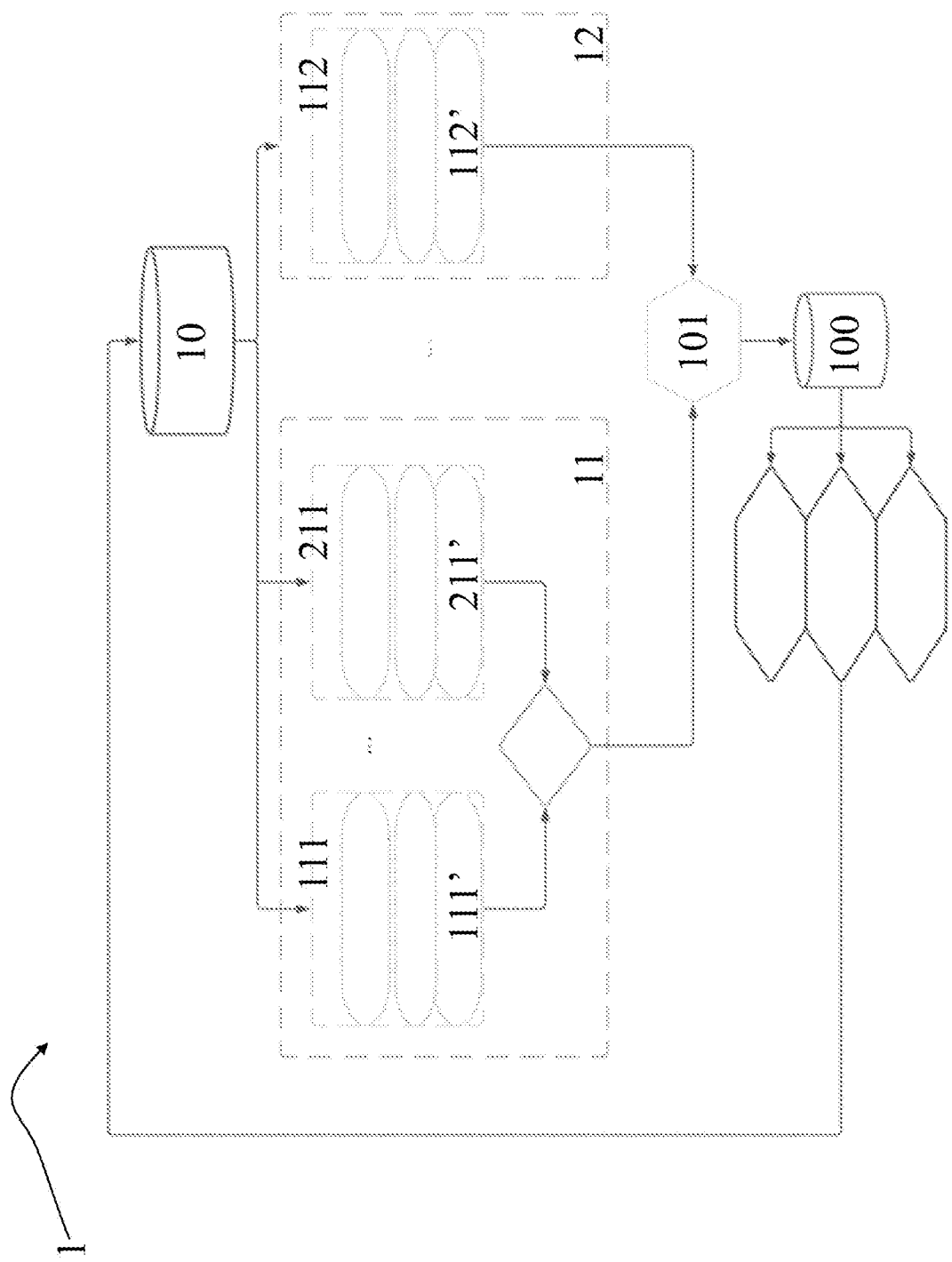

METHOD FOR EVALUATING QUALITY OF RULE-BASED DETECTIONS

FIELD OF INVENTION

The present invention relates to the field of security management of infrastructures, such as automation systems and industrial production systems.

In particular, the present invention relates to a method for evaluating quality of rule-based detections.

BACKGROUND ART

Security products of known type detect malicious attacks and sometimes are also able to take action to prevent them. The majority of intrusion prevention systems utilize one of detection methods between signature-based, statistical anomaly-based, and stateful protocol analysis. Signature-based IDS monitors packets in the Network and compares with pre-configured and pre-determined attack patterns known as signatures. An IDS which is anomaly-based will monitor network traffic and compare it against an established baseline. The baseline will identify what is normal for that network. Finally, the stateful protocol analysis detection identifies deviations of protocol states by comparing observed events with pre-determined profiles of generally accepted definitions of benign activity.

Signatures (also simply known as "rules") are used in the first of the aforementioned methods, wherein each approach has advantages and disadvantages. Behavioral rules allow a device to be protected from new and previously unknown attacks. However, the coverage of behavioral systems is limited, many attacks aren't covered and the system generates many more false positives.

A signature is actually a fingerprint of a given attack. The signature captures the actions, which are unique to a given attack. This pragmatic approach is focused on specific attacks and is very accurate at lowering the rate of false positives.

Security products are commonly shipped with a periodically updated knowledge base of the patterns associated with malicious activity or insecure systems' states. These patterns are shipped as part of the so-called rules or signatures. Once the rule pattern matches the activity on the endpoint or network, the customer becomes aware of it in the form of some alert in order to take action.

An increasing number of rules is available on a daily basis, so that the security product can heavy affect the user experience by raising a number of alerts relating to false positives.

It would therefore be desirable to evaluate quality of rule-based detections in a specific customer environment. In particular, it would be desirable to provide such evaluation in a silent way, wherein such rules do not raise alerts so that the users' experience will not be affected during the evaluation.

BRIEF DESCRIPTION OF THE INVENTION

The object of the present invention is to provide a method for evaluating quality of signature-based detections capable of minimizing the aforementioned drawbacks. In particular, it would be desirable to have a method capable to evaluate the aforementioned quality in a silent way.

According to the present invention is described, therefore, a method for evaluating quality of rule-based detections in an infrastructure provided with a plurality of sensors, specifically a method for evaluating quality of rule-based detections with silent rules.

The method comprises:
defining predefined rules for the rule-based detections, wherein the rules are of a silent type such that operate without generating alerts to the user of the infrastructure;
collecting telemetry events at each of the sensors;
storing the telemetry events of each of the sensors to respective local sensor databases operatively connected to the sensors;
aggregate, at predetermined aggregating time intervals, the telemetry events from the local sensor databases to a central database;
analyzing the telemetry events at the central database, by evaluating the telemetry events with respect to the rules and calculating the quality measurements of the rules, according to a plurality of predefined quality metrics in a predefined metrics time interval;
wherein the quality metrics comprise:
precision metric, by counting the instances of false positives of the telemetry events with respect to the predefined rules;
recall metric, by counting the instances of false negatives of the telemetry events with respect to the predefined rules; and
performance metric, by counting the instances of rules hits over predefined evaluation time interval and the ratio between the partial and full of the rules matching.
wherein the method for evaluating quality of rule-based detections further comprises releasing verified rules for the rule-based detections as predefined rules having the quality measurements within a predetermined quality target range, and
wherein the verified rules are of alerting type such that operate generating alerts to the user of the infrastructure.

In a further embodiment, the rules comprise identification of predefined activities,
wherein the collected telemetry events comprise one or more fields relating to the identified activities, and
wherein the evaluating compares the predefined activities with respect to the identified activities.

In a further embodiment, the attributes of the predefined activities comprise date and time.

In a further embodiment, the attributes of the predefined activities comprise their type and associated protocols.

In a further embodiment, the attributes of the predefined activities comprise indicators of compromise.

In a further embodiment, the rules comprise identification of predefined affected entities,
wherein the collected telemetry events comprise one or more fields relating to the identified affected entities, and
wherein the evaluating compares the predefined affected entities with respect to the identified affected entities.

In a further embodiment, the attributes of the predefined affected entities comprise details about the machine or network where one of the rules is triggered.

In a further embodiment, the attributes of the predefined affected entities comprise customer-identifying information.

In a further embodiment, the attributes of the predefined affected entities comprise the version of the product used.

In a further embodiment, the rules comprise identification of predefined technology involved,
wherein the collected telemetry events comprise one or more fields relating to the identified technology involved, and wherein the evaluating compares the predefined technology involved with respect to the identified technology involved.

In a further embodiment, the attributes of the predefined technology involved comprise the engine type.

In a further embodiment, the attributes of the predefined technology involved comprise the rules version.

In a further embodiment, the predefined rules are based one or more of the following formats:
packet rules;
Yara rules;
Stix rules.

In a further embodiment, the predefined rules are based on CPEs.

DESCRIPTION OF THE FIGURES

These and further features and advantages of the present invention will become apparent from the disclosure of the preferred embodiment, illustrated by way of a non-limiting example in the accompanying FIGURE, wherein:

FIG. 1 shows a block diagram of an apparatus carrying out the method for evaluating quality of rule-based detections, according to the present invention.

DETAILED DESCRIPTION OF THE INVENTION

The present invention relates to a method for evaluating quality of rule-based detections. In particular, the method according to the present invention found useful application in an infrastructure provided with a plurality of sensors.

Security products are commonly shipped with a periodically updated knowledge base of the patterns associated with malicious activity or insecure systems' states. These patterns are shipped as part of so-called rules or signatures. Once the rule pattern matches the activity on the endpoint or network, the customer becomes aware of it in the form of some alert in order to take action.

With the method of the present invention it is possible to collect events, by the way of the aforementioned sensors, allowing the security vendor to evaluate several quality metrics of rules. More in particular, the events may be collected in the customer environment directly and in a silent way as well. This collection is done by making use of rule of silent type, as will be described below in greater details.

The term "rule of silent type" relates, in the present invention, to rules which do not raise alerts so that the users' experience will not be sacrificed during the evaluation.

The term "rule of alerting type" relates, in the present invention, to rules which raise alerts so that the users are informed about the generated alerts and, in particular, which generate blocking detections.

According to the present invention is described, therefore, a method for evaluating quality of rule-based detections in an infrastructure provided with a plurality of sensors, specifically a method for evaluating quality of rule-based detections with silent rules.

The method comprises first defining predefined rules for the rule-based detections. Such a predefined rules are, in particular, of a silent type such that operate without generating alerts to the user of the infrastructure. The fact whether the rule is silent or alerting is defined in the body of the rule by using special keyword fields. However, it should be also important to ensure that old versions of sensors that are not aware of the existence of silent rules will not use them as alerting ones and this way generate false positives. It can be achieved by either using the syntax that would mark such rules as invalid on such sensors' side or by using these fields to physically separate silent and physical rules before the release by moving silent rules to a different directory that is not read by old versions of sensors.

In the embodiment herewith described, the rules comprise identification of predefined activities, identification of predefined affected entities and identification of predefined technology involved. According to different embodiments, more kind of rules or just one of the aforementioned rules can be employed as well.

In particular, according to the present embodiment, the attributes of the predefined activities can comprise date and time. Moreover, the attributes of the predefined activities can comprise their type and associated protocols. Finally, the attributes of the predefined activities can comprise indicators of compromise.

With regard to the predefined affected entities, according to the present embodiment, the attributes of the predefined affected entities can comprise details about the machine or network where one of the rules is triggered. Moreover, the attributes of the predefined affected entities can comprise customer-identifying information. Finally, the attributes of the predefined affected entities can comprise the version of the product used.

Furthermore, with regard to the identification of predefined technology involved, according to the present embodiment, the attributes of the predefined technology involved can comprise the engine type. Moreover, the attributes of the predefined technology involved can comprise the engine type. Finally, the attributes of the predefined technology involved can comprise the rules version.

As already described with regard to the rules, according to different embodiments, more kind of attributes or just one of the aforementioned attributes can be employed as well.

Examples of the predefined rules formats are YARA, STIX and Packet Rules. Moreover, predefined rules can be based on CPEs (Common Platform Enumeration). The information about the potential threat is generally stored together with other related information as part of the rule including but not limited to targeted sector, threat category, threat name and actor (if any).

The method further comprises collecting telemetry events at each of the sensors, then storing the telemetry events of each of the sensors to respective local sensor databases operatively connected to the sensors and finally aggregate, at predetermined aggregating time intervals, the telemetry events from the local sensor databases to a central database.

The predetermined aggregating time interval can be set by the user according to specific needs or computing resources.

In particular, as illustrated in FIG. 1, the data is collected on sensors deployed on customer environments and stored locally there. Periodically, it is propagated through a central management control and ends up in a single backend database allowing aggregation for further post-processing. In the embodiment of FIG. 1, an apparatus 1 is illustrated which comprises a plurality of customer environments 11, 12, each of which provided with one or more sensors 111, 211, 112. In particular, each customer environment can be provided with a plurality of sensors 111, 211, 112, as illustrated with regard to the customer environment 11, and, consequently, with a plurality of local databases 111', 211', 112', a local database for each sensor 111, 211, 112 to collect and to store telemetry from each of them. A central management control 101 is preferably provided, operatively connected with the aforementioned local databases 111', 211', 112' and able to aggregate, at predetermined aggregating time intervals, the telemetry events from the local database 111', 211', 112' of each sensor 111, 211, 112 to a central database 100, as schematically illustrated in FIG. 1. Moreover, a knowledge database 10 is also provided, arranged upstream to the customer environments 11, 12 and operatively connected to them as well. In particular, such a knowledge database 10 provides package with the various types of rules to the customer environments 11, 12, so that the method and the apparatus according to the present invention can operate.

As described before, collected telemetry events may contain various fields that allow the security vendor to attribute these rules to particular activity (such as date and time when it happens, type of activity and associated protocols, indicators of compromise), affected entity (details about the machine or network where the rule triggered, organization name, version of the product used), detection technology involved (detection engine type, its and rules' versions), etc. Examples of the collected event are below reported according to different sources of telemetry to be queried.

An example output of Packet Rules is the following:
{"time": "1625130360887", "ip_dst": "192.168.4.69", "ip_src": "192.168.3.175", "type_id": "SIGN:PACKET-RULE", "port_dst": "49908", "port_src": "46541", "protocol": "other", "trigger_id": "46e635e9-0b09-4904-a4f2-ab8bfd10a330", "threat_name": " ", "n2os_version": "21.3.0-06301449_9667B", "trigger_type": "packet_rules", "transport_protocol": "tcp"}.

An example output of Yara Rules, as an alert, is the following:
"time": "1632496294544", "ip_dst": "172.16.0.55", "ip_src": "172.16.0.253", "type_id": "SIGN:MALWARE-DETECTED", "port_dst": "445", "port_src": "1148", "protocol": "smb", "trigger_id": "9fecba2d-d4ac-489e-8119-8d507ece9a08", "threat_name": "Dragonfly2", "n2os_version": "21.4.0-09111034_A69B1", "trigger_type": "yara_rules", "transport_protocol": "tcp"}.

An example output of Stix Rules is the following:
{"time": "1632489948957", "ip_dst": "172.19.12.238", "ip_src": "151.80.144.253", "type_id":"VI:NEW-NODE: MALICIOUS-IP", "port_dst": "52690", "port_src": "14444", "protocol": "other", "trigger_id": null, "threat_name": "Threat Wannamine", "n2os_version": "21.4.0-09131814_699CE", "trigger_type": null, "transport_protocol": "tcp"}.

An example output of CPEs is the following:
{
  "name": "Some Product",
  "version": "33.3",
  "cpe": "cpe:/a:some_vendor:some_product:33.3:-:-",
  "n2os_version": "21.7.0-09210929_1D563"
}.

Everything else not covered by the cases above will be alerts, as for example the following:
{"time": "1631886927713", "ip_dst": null, "ip_src": "172.16.133.233", "type_id": "SIGN:NETWORK-SCAN", "port_dst": " ", "port_src": " ", "protocol": "icmp", "trigger_id": null, "threat_name": " ", "n2os_version": "21.4.0-09131814_699CE", "trigger_type": null, "transport_protocol": "icmp"}.

An important aspect of the invention relates to the collection of indicators allowing to evaluate performance metrics of rules (also called signatures) associated with various detection technologies, in a silent way. In addition, the same technology allows to collect information about the software and hardware used in the form of CPEs, in turn allowing to detect vulnerable software by their version.

Thus, the method comprises analyzing the telemetry events at the central database 100, by evaluating the telemetry events with respect to the rules and calculating the quality measurements of the rules, according to a plurality of predefined quality metrics in a predefined metrics time interval.

The predefined quality metrics therefore can be set according to the user which manage the apparatus, based on the experience or the previous analysis. As per the example of the present embodiment, the quality metrics can comprise precision metric, recall metric and performance metric.

The precision metric is defined by counting the instances of false positives of the telemetry events, i.e., the benign activity that should not be detected, with respect to the predefined rules.

The recall metric is defined by counting the instances of false negatives of the telemetry events, i.e., missed activities that are supposed to be detected but were not, with respect to the predefined rules.

Finally, performance metric is defined by counting the instances of rules hits over predefined evaluation time interval and the ratio between the partial and full of the rules matching. This metric checks how often the whole rule and its preliminary checks trigger across multiple customers to notice potential serious adverse effects on the system performance.

According to different embodiments, more kind of quality metrics or just one of the aforementioned quality metrics can be employed as well.

The collected telemetry events can comprise one or more fields relating to the identified activities, one or more fields relating to the identified affected entities and one or more fields relating to the identified technology involved.

When rules of such a type are employed, the evaluating compares the predefined activities with respect to the identified activities, when one or more fields relating to the identified activities are present. In the same way, the evaluating compares the predefined affected entities with respect to the identified affected entities, when one or more fields relating to the identified affected entities are present, and the evaluating compares the predefined technology involved with respect to the identified technology involved, when one or more fields relating to the identified technology are present.

The evaluation allows to confirm the high-quality of rules, which can then be released as alerting rules. In this regard, the method for evaluating quality of rule-based detections further comprises releasing verified rules for the rule-based detections as predefined rules having the quality measurements within a predetermined quality target range. Such a verified rules are of alerting type such that operate generating alerts to the user of the infrastructure and define, therefore, high-quality rules with respect to the predefined quality metrics which are taken into account.

The same method and apparatus can be also employed to collect quality metrics about not silent rules (i.e., the ones that generate alerts). The implementation behind them and the purpose will be exactly the same, the only difference will be that in this case, the customer will become aware of the fact of the triggered rule because of the raised alert coupled with the telemetry sent while silent rules only send telemetry without rising such alerts.

Moreover, the same method and apparatus can be also employed, in particular by the security vendor, to collect information about the software and hardware used by customers in the form of CPEs. They are treated the same way as other rules allowing the vendor to detect vulnerable software by comparing the versions of deployed systems, software and packages with the vulnerable ones and this way identify security weaknesses.

The present invention therefore provides a method for evaluating quality of signature-based detections capable of minimizing the aforementioned drawbacks. In particular, the present invention provides a method capable to evaluate the aforementioned quality in a silent way.

The invention claimed is:

1. A method for evaluating quality of rule-based detections in an infrastructure provided with a plurality of sensors, comprising:
   defining predefined rules for said rule-based detections, wherein said rules are of a silent type such that operate without generating alerts to the user of said infrastructure;
   collecting telemetry events at each of said sensors;
   storing said telemetry events of each of said sensors to respective local sensor databases operatively connected to said sensors;
   aggregate, at predetermined aggregating time intervals, said telemetry events from said local sensor databases to a central database;
   analyzing said telemetry events at said central database, by evaluating said telemetry events with respect to said rules and calculating the quality measurements of said rules, according to a plurality of predefined quality metrics in a predefined metrics time interval;
wherein said quality metrics comprise:
   precision metric, by counting the instances of false positives of said telemetry events with respect to said predefined rules;
   recall metric, by counting the instances of false negatives of said telemetry events with respect to said predefined rules; and
   performance metric, by counting the instances of rules hits over predefined evaluation time interval and the ratio between the partial and full of said rules matching;
wherein said method for evaluating quality of rule-based detections further comprises releasing verified rules for said rule-based detections as predefined rules having said quality measurements within a predetermined quality target range, and
wherein said verified rules are of alerting type such that operate generating alerts to the user of said infrastructure.

2. The method for evaluating quality of rule-based detections in an infrastructure provided with a plurality of sensors according to claim 1,
   wherein said rules comprise identification of predefined activities,
   wherein said collected telemetry events comprise one or more fields relating to the identified activities, and
   wherein said evaluating compares said predefined activities with respect to said identified activities.

3. The method for evaluating quality of rule-based detections in an infrastructure provided with a plurality of sensors according to claim 2,
   wherein the attributes of said predefined activities comprise date and time.

4. The method for evaluating quality of rule-based detections in an infrastructure provided with a plurality of sensors according to claim 2,
   wherein the attributes of said predefined activities comprise their type and associated protocols.

5. The method for evaluating quality of rule-based detections in an infrastructure provided with a plurality of sensors according to claim 2,
   wherein the attributes of said predefined activities comprise indicators of compromise.

6. The method for evaluating quality of rule-based detections in an infrastructure provided with a plurality of sensors according to claim 1,
   wherein said rules comprise identification of predefined affected entities,
   wherein said collected telemetry events comprise one or more fields relating to the identified affected entities, and
   wherein said evaluating compares said predefined affected entities with respect to said identified affected entities.

7. The method for evaluating quality of rule-based detections in an infrastructure provided with a plurality of sensors according to claim 6,
   wherein the attributes of said predefined affected entities comprise details about the machine or network where one of said rules is triggered.

8. The method for evaluating quality of rule-based detections in an infrastructure provided with a plurality of sensors according to claim 6,
   wherein the attributes of said predefined affected entities comprise customer-identifying information.

9. The method for evaluating quality of rule-based detections in an infrastructure provided with a plurality of sensors according to claim 6,
   wherein the attributes of said predefined affected entities comprise the version of the product used.

10. The method for evaluating quality of rule-based detections in an infrastructure provided with a plurality of sensors according to claim 1,
    wherein said rules comprise identification of predefined technology involved,
    wherein said collected telemetry events comprise one or more fields relating to the identified technology involved, and
    wherein said evaluating compares said predefined technology involved with respect to said identified technology involved.

11. The method for evaluating quality of rule-based detections in an infrastructure provided with a plurality of sensors according to claim 10,
    wherein the attributes of said predefined technology involved comprise the engine type.

12. The method for evaluating quality of rule-based detections in an infrastructure provided with a plurality of sensors according to claim 10,
    wherein the attributes of said predefined technology involved comprise the rules version.

13. The method for evaluating quality of rule-based detections in an infrastructure provided with a plurality of sensors according to claim 1,
    wherein said predefined rules are based one or more of the following formats:
    packet rules;
    Yara rules;
    Stix rules.

14. The method for evaluating quality of rule-based detections in an infrastructure provided with a plurality of sensors according to claim 1,
    wherein said predefined rules are based on CPEs.

* * * * *